United States Patent Office.

AARON M. DANIELS, OF HARTFORD, CONNECTICUT, ASSIGNOR TO HIMSELF AND BENJAMIN BENETT.

Letters Patent No. 72,460, dated December 24, 1867.

IMPROVED ARTIFICIAL FUEL.

The Schedule referred to in these Letters Patent and making part of the same.

TO ALL WHOM IT MAY CONCERN:

Be it known that I, AARON M. DANIELS, of the city and county of Hartford, and State of Connecticut, have invented certain new and useful Improvements in Artificial Fuel; and to enable others skilled to compound or produce the same, I will proceed to describe the mode or process by which the same is effected.

The nature of this invention will be understood from the following:

The object desired to be attained by this improvement is to consolidate combustible materials (which heretofore have been considered almost worthless,) to produce a good and cheap fuel.

This compound is composed of the following articles, which are susceptible of variable proportions: Coal-dust from anthracite or bituminous coal, one hundred and forty pounds; coal-tar, one gallon; benzine, one quart; rosin, two pounds; sulphur, one ounce.

First, place the coal-tar in a suitable vessel for heating and manipulation, then add the benzine, and stir till the coal-tar is well cut. Place it over a fire, add the rosin, and stir till well mixed, then pour the sulphur over the surface. After this, remove it from the fire, stir in the coal-dust, and it is ready to be formed into small lumps by the use of moulds or other convenient way, when it will be ready for use. In this way I am enabled to produce a cheap and useful fuel.

I believe I have thus shown the nature, advantage, and mode or process of compounding, so as to enable others skilled in the art to practise the same.

What I claim, therefore, and desire to secure by Letters Patent, is—

A compound for artificial fuel, substantially as described.

A. M. DANIELS. [L. S.]

Witnesses:
N. C. WILDER,
J. W. BLISS.